Inventor
Benno Schwarz

May 6, 1947.  B. SCHWARZ  2,420,266

ELECTRIC FREQUENCY CONVERTER

Filed June 2, 1943  2 Sheets-Sheet 2

Inventor
Benno Schwarz
by [signature]
Atty.

Patented May 6, 1947

2,420,266

UNITED STATES PATENT OFFICE 2,420,266

ELECTRIC FREQUENCY CONVERTER

Benno Schwarz, Norwich, England

Application June 2, 1943, Serial No. 489,417
In Great Britain June 5, 1942

17 Claims. (Cl. 172—281)

1

This invention relates to electric frequency converters and their application.

The conversion of A. C. of one frequency to A. C. of another frequency has hitherto in practice been carried out by rotary frequency changers, one part of which has to be driven mechanically at a certain speed in order to obtain a certain ratio of frequency between the input and output side.

This implies a transformation of part of the energy mechanically through the shaft of the machine.

In order to vary the ratio of frequencies in such frequency changers, the driving speed has to be changed.

Heretofore, self driven frequency converters for the delivery of a variable output frequency had to be equipped with comparatively involved means, for instance adjustable brushgear, for adjusting their speed and correct excitation.

The object of the present invention is to obtain, by means of a self-driven frequency converter, a voltage of variable and adjustable frequency and magnitude.

The frequency converter according to the present invention has a stator provided with a multiphase excitation winding excited with an alternating current of the supply frequency, and a wound rotor provided with a commutator to which a winding on the rotor is connected, and slip rings to which tappings in said rotor winding or in another winding on the rotor are connected, the commutator having stationary brushes which are fed through a variable voltage transformer from the supply line with the power input to be converted, and the slip rings delivering an output voltage of variable and adjustable frequency and magnitude in operation of said converter.

Examples of the invention and its application are illustrated by the accompanying diagrammatic drawings, in which:

Figure 2 illustrates another example in which

2 the frequency converter is fed from a single phase supply of constant voltage and frequency, and delivers a three phase output which is utilised to obtain speed variation of a three phase induction motor, the arrangement incorporating also combined voltage regulation in both the stator and rotor circuits of the frequency converter.

Figure 3:
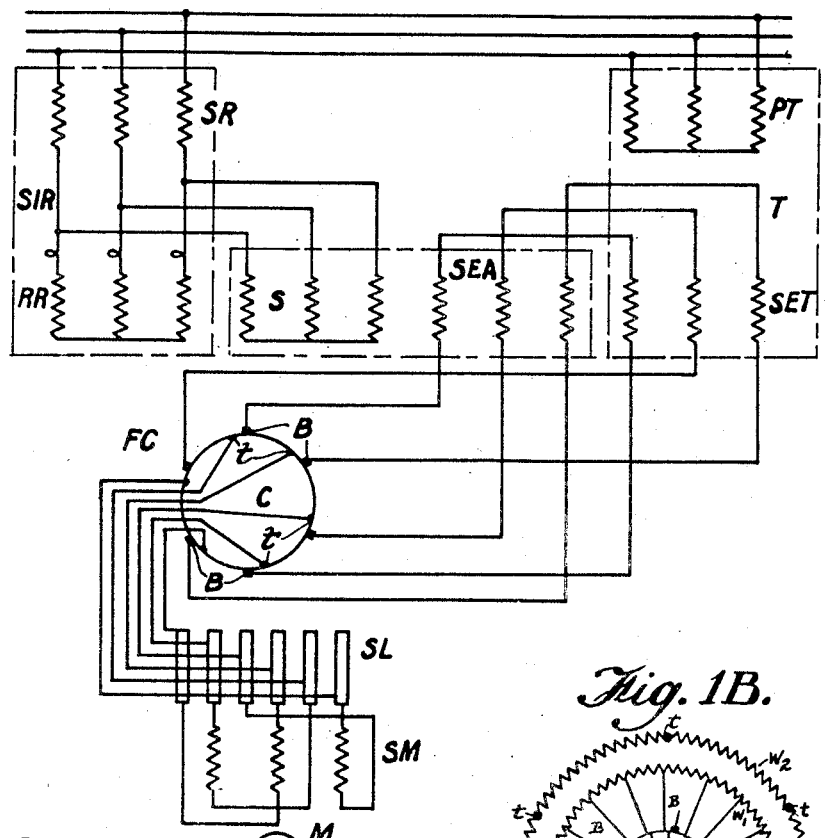
Figure 1B:
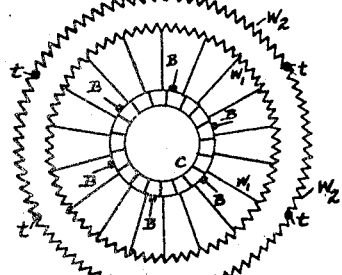
Figures 1A and 1B are detail views illustrating respectively and diagrammatically a rotor with one winding and a rotor with two windings thereon, together with the tappings and commutator brushes.
Figure 1A:
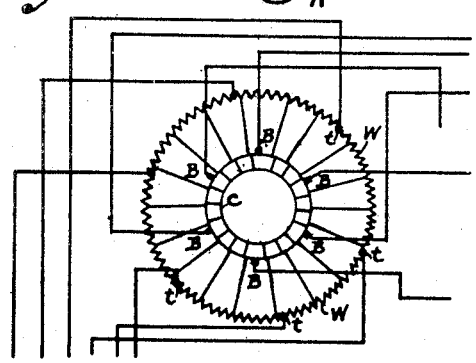

Figure 3 illustrates a further example, embodying a frequency converter with combined stator and rotor regulation and having an auxiliary stator winding for the rotor voltage regulation, the converter in this example being fed from a three phase supply.

Figure 1:
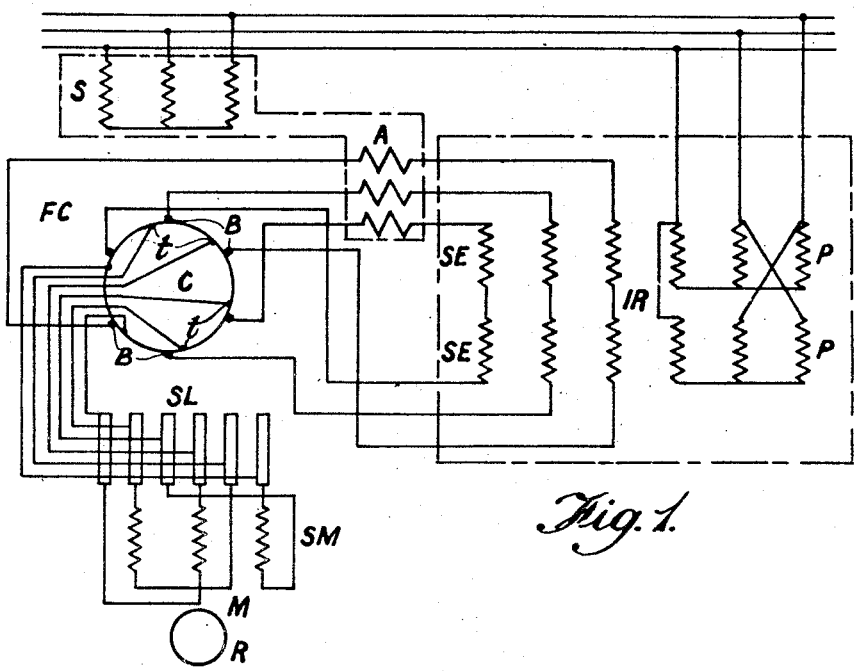
Figure 1 illustrates one example comprising a frequency converter which is supplied with three phase current of substantially constant frequency and voltage, and delivers a variable voltage of variable frequency which is applied to the stator winding of an induction motor for the purpose of obtaining a variable and adjustable speed of the motor.

In Figure 1, S represents a stator winding, and C a rotor winding and a commutator to which it is connected, of a frequency converter FC.

The stator winding S is of the same character as that of the stator winding of an induction motor and, in this example, it is directly connected to a supply line of essentially constant voltage and frequency.

The rotor winding C has six tappings $t$, which are connected to six slip rings SL mounted on but suitably insulated from the rotor shaft or an extension thereof.

The commutator has six phase stationary brushes B of fixed positions, which are fed in open three-phase connection from the secondary SE of a double induction regulator IR, the primary P of which is connected to the supply line.

Any other suitable form of variable voltage transformer can, however, be employed.

In the embodiment shown in Fig. 1 an auxiliary winding A is introduced in the commutator circuit. This auxiliary winding A can be accommodated either in the stator of the converter or in the primary of the induction regulator. It can also be a secondary winding of any other transformer or regulator fed from the same supply. This auxiliary winding A can be, however, omitted if no compensating or speed shifting effect is required.

The frequency converter FC, as described above, is shown by way of one example as applied to the feeding of an induction motor M and for the purpose the stator winding SM of the motor is connected in open three-phase connection to the six slip rings SL of the frequency converter.

The rotor R of the motor M can be of any known description.

The motor M can be a synchronous machine, if so desired.

By providing six tappings $t$ in the rotor winding C of the frequency changer and providing six slip rings SL, to which the tappings t are connected, a three-phase supply with three open phases can be obtained and can be used to feed the stator winding SM of the induction motor M with three open phases.

The double induction regulator IR produces a secondary voltage which, in accordance with the relative positions of the primary and secondary parts of said regulator, varies from a maximum value in one extreme position through zero to a minimum value of the same numerical magnitude, but of opposite phase position, in the other extreme position.

Assuming the adjusted value of the induction regulator secondary voltage to be equal to that of the voltage at the commutator brushes B, when the converter FC is at standstill, with its stator winding S connected to the supply, the induction regulator secondary voltage can be applied to the commutator brushes B, the brushgear being so positioned that the two voltages, namely, the voltage induced in the rotor winding and the secondary voltage of the induction regulator, balance one another.

Under such conditions, the rotor of the converter FC will remain at standstill.

The converter will then act as a transformer and the frequency at the slip rings SL will be the same as the supply frequency, e. g., 50 cycles.

By reducing the regulator voltage to say half its value, the rotor voltage of the converter in excess of this value will cause a current to flow through the secondary circuit and so set the rotor of the converter in rotation and accelerate it until the commutator voltage is equal to the induction regulator voltage, such equalisation occurring at half the synchronous speed of the converter.

The frequency at the slip rings SL will then be one half of the supply frequency, namely, 25 cycles.

By reducing the secondary voltage of the induction regulator IR to zero, the rotor of the converter FC will accelerate to its synchronous speed and by changing the direction of the induction regulator voltage said rotor will exceed its synchronous speed in proportion to the magnitude of the regulator voltage in the changed direction.

The frequency at the slip rings SL which, at synchronism, is zero will increase again but the direction of rotation of the phases in the output supply from the slip rings will change.

The induction motor M, in the present example, constitutes the load for the frequency converter FC on the slip ring side thereof and, when the motor M is switched in at the synchronous speed of the converter, it will remain at standstill, as there is neither any frequency nor voltage at the slip rings SL at the synchronous speed of the converter.

By raising or lowering the speed of the frequency converter FC above or below synchronous speed, a voltage of increasing value and proportionately increasing frequency is obtained at the slip rings SL of the frequency converter and is supplied to the stator winding SM of the induction motor M.

This voltage causes a current to flow through the stator winding SM of the induction motor M, thereby creating a torque in one or the other direction of rotation of the motor, in accordance with the direction of rotation of the output supply phases determined by the hyper or sub-synchronous speed of the frequency converter FC.

The speed of the induction motor M will increase in proportion to the frequency and voltage at the slip rings SL of the converter.

At double the synchronous speed or at standstill of the converter, the frequency in the secondary circuit will be equal to the supply frequency and, by increasing the speed of the converter to above double the synchronous speed or by operating it against its rotating field, the frequency in the secondary circuit increases beyond the supply frequency.

In order to obtain these latter conditions, the secondary voltage of the induction regulator IR must exceed the standstill voltage, in either direction, at the commutator C.

The load current taken from the slip rings SL of the frequency converter FC is balanced in the rotor of the converter by a current flowing into said rotor through the induction regulator IR and the commutator C and brushes B from the supply line.

There are only resultant currents effectively existent in the rotor which are equal to the vectorial difference between the commutator and the slip ring currents, the amount of which depends on the number of phases at the input and output side.

In the present example, with six phases on both sides, the rotor losses created by these effective rotor currents are only a fraction of the losses which would be created by the full input or output current, but the losses can be still more reduced by a further increase in the number of phases.

The rotor and rotor winding can, therefore, be designed for a comparatively small proportion only of the full output passing through the converter.

The stator winding S is only loaded with wattless current as the converter cannot develop torque since it is, mechanically, neither driven nor driving.

Torques are only created transiently on adjustment of the rotor speed for the acceleration or deceleration of the rotor inertia.

The stator winding S, therefore, requires to be designed essentially only for wattless currents as far as existent.

The additional winding A, introduced in the supply circuit, for instance as shown in Figure 1 in the leads to the commutator brushes B, can be used for introducing a voltage at right angles to the variable secondary voltage of the induction regulator IR for the purpose of power factor correction of the converter itself and of the inductive load represented, for instance, by the wattless kva. required by the induction motor M.

The voltage produced by the auxiliary winding A can, moreover, also include a component in the vectorial direction of the variable secondary voltage of the induction regulator IR in order to enable the regulator to be used to greater advantage and to be reduced in size, in the case where passing through zero frequency, that is to say, through the synchronous speed of the frequency converter, is not required, or where the frequency and maximum speed of the induction motor M in one direction of rotation is not equal to the frequency and maximum speed in the other direction of rotation.

If, for instance, a speed variation of 1:4 and only in one direction of rotation is required for the induction motor M, and the frequency range chosen for this purpose is 10 to 40 cycles, the frequency converter FC would have to be operated between 120 and 180% of its synchronous speed assuming that the hyper-synchronous range is chosen as the range of operation.

If the induction regulator IR had to cover the whole voltage range, it would be required to have a maximum secondary voltage of 80% of the standstill commutator voltage.

By the introduction of a speed regulating voltage component in the auxiliary winding A equivalent to 50% of the commutator standstill voltage, 150% of the synchronous speed is obtained without the induction regulator IR. The regulator IR is required, therefore, to cover ±30% of the commutator stand-still voltage only and its size can, consequently, be reduced in the proportion of 30:80.

Another possibility of obtaining speed and frequency variation is to vary the effective voltage applied to the stator winding S of the frequency converter as against the voltage obtained from the supply so varying, at the same time, the standstill commutator voltage.

It will be appreciated that variation of the commutator voltage by altering the flux of the frequency converter while applying a constant supply voltage to the commutator brushes B will result in a variation of the speed and frequency at the slip rings SL of the converter.

In contradistinction to the earlier described regulating system, the voltage at the slip rings SL will, however, be constant with changing frequency.

The induction motor M fed from the slip rings SL will, therefore, be operated under conditions of decreasing flux with increasing frequency and speed.

The motor thus serves advantageously to provide for constant output whereas under the earlier described system it provided for constant torque and proportionately increasing output with increasing speed.

The two systems of speed and frequency variation, namely, variable supply voltage at the brushes and variable stator voltage can be combined by using two separate variable voltage transformers for the two circuits or any other combination, for instance, one double or single induction regulator with two suitably arranged secondaries.

It may, for instance, be advantageous to cover a certain speed range, say 1:2, between 10 and 20 cycles, by variation of the commutator voltage, thereby enabling the induction motor to be operated with constant torque and to cover the remainder of the speed range between 20 and 40 cycles by stator voltage regulation of the frequency converter.

Within this range (i. e., between 20 and 40 cycles) the voltage will, therefore, remain constant at the slip rings SL and, consequently, also at the stator SM of the induction motor M, and the motor will then operate to give a constant output.

There are many instances where constant output is required for part only of the speed range, for example in the operation of machine tools and so forth.

This arrangement has the advantage of reducing the iron losses and magnetising current of the frequency converter FC and the induction motor M, which otherwise would operate only at part of its load.

More important still is the fact that the commutator voltage and, therefore, the voltage between adjacent commutator bars of the frequency converter are not increased beyond the value required for the operation with a frequency of 20 cycles in the rotor.

The voltage between the commutator bars is, of course, as with every commutator machine, the guiding figure for the design, so that considerable saving can be effected by adopting the combined system of regulation.

Such combined voltage regulation in the stator and rotor circuit, can be effected by means of one variable voltage transformer used for both purposes. By such simultaneous voltage regulation in both circuits the further advantage can be obtained that the ratio between voltage and frequency is gradually and automatically changed through the range.

Figure 2:
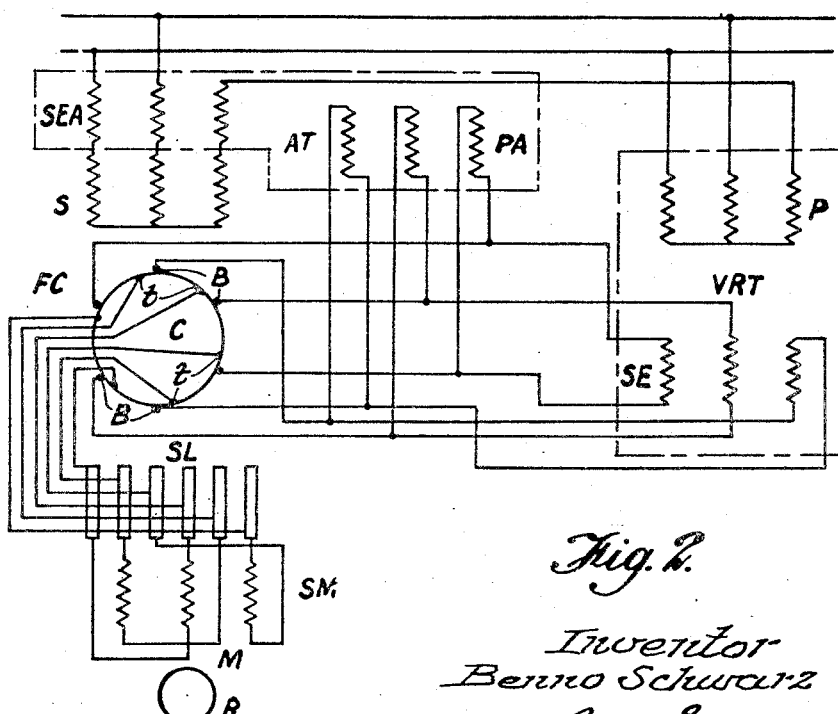

Figure 2 illustrates an example where such combined rotor and stator voltage regulation is applied to a frequency converter FC fed from a single phase supply.

In this particular example, which provides for combined frequency and phase conversion, the rotor of the frequency converter produces a phase splitting effect, so that all the circuits can be multi-phase circuits and, for instance as illustrated in the figure, three-phase circuits with six-phase operation in the rotor.

In the arrangement illustrated by Figure 2, VRT indicates a variable voltage transformer, which is not shown in detail as its construction will be fully appreciated by those skilled in the art and is not material to the explanation of the arrangement. It may, for instance, be a double or single induction regulator, or it may be any other variable voltage transformer or transformer combination known in the art.

In this particular example, it is a three-phase transformer, P representing the primary and SE the secondary.

Also, in this particular example, the stator winding S of the frequency converter FC is a three-phase winding, star connected, but it may be delta-connected and it may have a number of phases differing from three.

Two of the phases of the stator winding S of the converter FC, and two corresponding phases of the primary P of the transformer VRT are connected to the single phase line supply, and the remaining phase of the stator winding S is connected to the remaining phase of the transformer primary P. The secondary SE of the transformer VRT is connected to the commutator brushes B of the converter FC in like manner to that described with reference to Figure 1 and, similarly as in Figure 1, the load is again constituted by a three-phase induction motor M fed from the slip rings SL, as previously described. Where the stator winding S of the converter FC has a number of phases other than three, for instance, two, four or more, the transformer primary P has a corresponding number of phases.

When the rotor of the frequency converter FC rotates, a rotating field is produced in the stator of that machine and that phase of the stator winding S which is not connected to the line will, therefore, produce a voltage approximately symmetrical to the voltages of the other two phases, so that the primary winding P of the variable voltage transformer VRT is virtually fed by a symmetrical three-phase system.

This phase splitting effect is supplemented by the action of the rotor in the rotating field, as there is an almost symmetrical voltage at the commutator brushes B which, in their turn, impress on the three open secondary phases SE of the variable voltage transformer VRT, a symmetrical three-phase voltage as soon as the machine is operated at any other than the synchronous speed.

In this way, any dis-symmetries of the three-phase system, as determined by the action of the stator winding S of the converter and applied to the winding P and, therefore, transferred by transformer action to the winding SE of the variable voltage transformer, is therefore equalised by the influence of the rotor winding C itself. This is especially true for the hyper-synchronous range.

The function as regards the speed and frequency variation in line with the variation of the secondary voltage applied to the brushes is essentially the same as described before in connection with a three-phase supply system.

There is, however, illustrated in Figure 2 an additional winding SEA, in series connection with the stator winding S of the frequency converter FC, this additional winding SEA introducing a variable voltage in the circuit of the stator winding S.

The winding SEA can be the secondary winding of an auxiliary transformer AT, the primary PA of which is connected to the secondary SE of the variable voltage transformer VRT in the example illustrated, but said winding SEA may be another secondary winding of the variable voltage transformer VRT itself.

In the example illustrated by Figure 2, the voltage introduced into the primary circuit of the frequency converter FC will be zero at the synchronous speed, so that the full line voltage is in this case applied to the stator winding S.

With increasing frequency, the voltage in the winding SEA increases and this winding may be introduced in such a way, as will be appreciated by those skilled in art, that the voltage in it reduces the supply voltage, so that the resulting voltage at the terminals of the stator winding S decreases with increasing frequency.

The resulting reduction of the flux in the frequency converter FC will have the effect of reducing the voltage at the brushes B, so reducing the required speed regulating voltage delivered by the secondary winding SE of the voltage regulating transformer VRT and at the same time, as mentioned above, easing the commutator conditions and reducing the iron losses.

Such an arrangement is especially suitable for traction purposes and the like, where a high starting torque, i. e., at low frequencies, is required, whereas at high speeds a smaller torque will be sufficient, as high speeds only are permissible if the required torque does not exceed certain limits.

Another example of a combined regualtion in the rotor and stator circuit of the frequency changer according to the invention is illustrated by Figure 3.

In this example, a three-phase supply and a six-phase rotor connection are adopted and the same reference letters as in the previous examples are used as far as applicable to denote corresponding parts.

The combined stator and rotor regulation, in the example illustrated by Figure 3, is carried out by a single induction regulator SIR.

This single induction regulator SIR has the three phase windings of its stator winding SR connected at one end to the three-phase supply, and at the other end to the three-phase windings of its rotor winding RR. The stator winding S of the frequency converter FC is connected to the junction between the windings SR and RR of the regulator.

Under these conditions, a variable voltage is applied to the stator winding S of the frequency converter, the variation being from a minimum value in the co-axial position of the windings SR and RR of the regulator to increasing values when the rotor of said regulator is adjusted from this co-axial position in either direction.

The rotor voltage of the frequency converter FC is the resultant of a variable voltage supplied by the winding SEA and a constant voltage supplied by the secondary winding SET of a constant ratio transformer T, the primary PT of which is connected to the supply. The winding SEA is accommodated in the stator of the frequency converter FC and so forms the secondary of a transformer having as its primary the stator winding S, which is fed with a variable voltage from the single induction regulator SIR.

The winding SEA could be the secondary winding of a separate transformer having its primary fed with a variable voltage from the single induction regulator SIR, as will be readily appreciated by those skilled in the art, without necessitating illustration.

The windings SEA and SET are connected in series and to the commutator brushes B of the frequency converter FC, and the resultant variable voltage may, with advantage, include a compensation voltage component, taking into consideration the possibilities offered by the phase displacement of the voltage applied to the stator winding S of the frequency converter, such voltage being dependent on the actual adjustment of the single induction regulator SIR.

If the two voltages of SET and SEA are essentially opposed vectorially to each other, conditions can be established such that the difference between them is essentially zero at a position of the induction regulator SIR for high voltage, so that the frequency converter will rotate at a speed near to its synchronous speed.

The single regulator SIR as shown in Figure 3 has electrically connected stator and rotor windings SR and RR respectively.

The vectorial sum of the voltages induced in these electrically connected windings is equal to and balances the constant supply voltage. The angle between the vectors of the rotor and stator voltage depends on the relative position of the rotor and stator of the induction regulator.

In the rotor position in which each phase winding in the rotor is co-axial with the phase winding in the stator, with which it is electrically connected, the two voltage vectors are in phase and are adding, therefore, algebraically. This at the same time means that both of these voltages attain their minimum value.

By approaching the minimum position, the voltage applied to the stator winding S of the frequency converter decreases as the winding S is connected to the junction point of the electrically connected windings SR and RR of the induction regulator SIR. This results in a reduction of the voltage referred to standstill conditions, in the rotor winding C and at the commutator brushes B. At the same time, the voltage in the auxiliary stator winding SEA will decrease and a substantial difference between the voltages SET and SEA will be created. This voltage difference, applied to the commutator brushes, will change the rotor speed to the same extent as its ratio to the rotor voltage, at standstill.

It will be seen from this explanation that a decreasing stator voltage and, therefore, decreasing internal rotor voltage in the frequency converter, coincides with an increased resultant of the combined external voltages in the rotor circuit, applied to the commutator brushes B.

With increasing frequency, consequently, the external voltage necessary for a certain speed and frequency adjustment decreases relatively.

It will be seen, therefore, that a variable voltage transformer of only a comparatively small output is required to obtain wide speed and frequency range, as a large proportion of the output is transferred not by the induction regulator but by the constant ratio transformer T, which can feed a number of such frequency changers.

It is to be understood that the above example is not confined to the use of the single induction regulator SIR described, as any other suitable voltage regulating induction regulator or transformer, or combination thereof, can be used in place of said single induction regulator SIR.

The above described application of the frequency converter to the feeding of an induction motor M, in order to obtain speed variation of the motor, has many advantages over other systems of variable speed drives.

An induction motor is the simplest and most reliable design of any electric motor. In the present application it can be equipped with a squirrel cage rotor as there are no starting difficulties whatsoever, in view of the gradual increase of the frequency from zero or from a very low frequency.

The resistance of the cage can, for the same reason, be very small, resulting in a very small slip, as the motor even so will develop a high torque at starting, owing to the applied low frequency.

The induction motor dimensions are comparatively small, so reducing the space requirement and thus enabling the motor to be accommodated in places where D. C. motors or A. C. commutator motors could not ordinarily be used.

Moreover, the squirrel cage motor can be installed in places not readily accessible, since there is practically no maintenance required as compared with commutator machines.

Furthermore, it is easier totally to enclose this type of motor and to build them in machine tools, for example.

The frequency converter FC itself can be installed separately from the motor M in a place where it is readily accessible for maintenance purposes and where the atmospheric conditions are favourable for the cooling and operation of the machine.

The frequency converter FC can be mounted vertically in order to save floor space as it is neither driven nor drives mechanically.

The above described possibility of starting the squirrel cage motor M does not result in any starting losses; the arrangement is, therefore, eminently satisfactory where the motor has frequently to be started and stopped, and especially for totally enclosed motors, as there is little heating in the secondary circuit of the induction motor during the starting period and no excessive starting current is taken from the supply.

On the contrary, the starting current, even with high starting torques will be lower than the full load current for the higher speeds, in so far as the supply line is concerned.

Quick and effective reversing without losses is possible as, for this purpose, the frequency converter has only to be operated through synchronism.

The inertia of the squirrel cage motor is inherently small as compared with any commutator machine, and so is the inertia of the frequency converter.

The energy or part of it required for the acceleration of the induction motor can be obtained from the stored energy of the frequency converter FC, by arranging that an increase of the speed of the induction motor coincides with a reduction of the speed of the frequency converter. This can be achieved with the frequency converter operating in its sub-synchronous range.

If, for example, a six-pole induction motor M is used with a maximum speed of 800 R. P. M., the frequency at the terminals of its stator SM requires to be increased from zero to 40 cycles, in order to start the machine up to its full speed.

Using a six-pole frequency converter FC in its sub-synchronous range would mean decreasing its speed from 1000 R. P. M. to 200 R. P. M., in order to cover the frequency range from zero to 40 cycles.

In other words, the acceleration of the induction motor rotor R coincides with a deceleration of the frequency converter rotor. Supposing these two rotors to have the same inertia, the whole energy for the acceleration of the induction motor will be covered by the stored energy of the converter rotor.

The advantage is obvious as this energy has not to be taken from the supply. This is important, especially at quick and frequent starts. Moreover, the reverse occurs when the induction motor M is brought to a standstill, the frequency at the converter slip rings SL being brought down to zero, which means an acceleration of the converter rotor from 200 to 1000 R. P. M.

Such an arrangement as above described applies to a uni-directional drive with start and breaking, or acceleration and deceleration within limits.

In order to obtain the same advantage with a reversible drive, the leads between the slip rings SL and the stator winding SM of the induction motor M have to be changed over to start the motor in the reverse direction of rotation, the frequency converter FC operating in the sub-synchronous range for both directions of rotation of the motor M.

As described earlier in the specification, it is possible, however, to avoid a change-over switch-gear for reversing the motor by simply accelerating the converter beyond synchronism, which results in a change of direction of rotation of the phases of the supply connected with the slip rings.

Adopting the system of reversing, the amount of work to be put into both rotors for the acceleration in the form of stored energy is, of course, additive.

It is possible, however, to draw some advantage from the phenomena described even in the case of such a reversible drive, if the maximum speeds in the two directions of rotation are not equal. If, for instance, in the previously described example, the motor has to be reversed and started in the opposite direction of rotation up to 400 R. P. M. only, entailing a frequency of 20 cycles in its stator winding, the amount of inertia required to achieve this in the hyper-synchronous range of the converter will still be moderate, whereas the gain obtained by the arrangement in the forward direction of rotation remains considerable.

In such a case it is advantageous to co-relate that direction of rotation of the induction motor in which it has to run up to the higher speed, with the sub-synchronous range of the converter.

A synchronous motor can be substituted for the induction motor. Such substitution does not involve special provisions for starting, since a synchronous motor also follows increase of frequency with a considerable torque and small starting current when excited from the outset.

The invention is not confined to the application of variable frequency to the feeding of the primary part of an induction or synchronous motor; it is applicable in general where variable frequency is required.

One of such other applications is to the feeding of the rotor circuit of a slip ring motor, to adjust the speed of the motor to any speed different from its synchronous speed.

It will be appreciated from the general principle of the arrangement according to the invention that such arrangement as applied to the control of a motor has the advantage of an independent frequency converter, not requiring to be kept in step with the motor either mechanically, for instance by means of gearing, or electrically, by means of synchronous machines, in order to maintain the same frequency.

The frequency converter can, therefore, be designed for any number of poles and located independently from the motor or other machine it is used to control.

The invention is, moreover, not confined to the application of the variable frequency to a single machine, as such variable frequency can be equally well applied, as will be readily appreciated by those skilled in the art without the necessity for illustration, to several synchronous or asynchronous machines, such as motors stator fed in parallel or in series, so providing for a group of variable speed motors to be controlled by one frequency converter.

In an analogous way, several slip ring motors can be controlled by one frequency converter feeding their parallel-connected rotor windings.

I claim:

1. An electric frequency converter comprising a wound stator having a multiphase excitation winding to be excited with alternating current of the supply frequency, a wound rotor, a commutator rotatable with said rotor, said commutator having its segments electrically connected to a winding on said rotor, slip rings rotatable with said rotor, said slip rings being connected to tappings in a winding on said rotor, stationary brushes for said commutator and a variable voltage transformer for feeding said brushes from the supply line with the power input to be converted in frequency, said slip rings delivering an output with a voltage of variable frequency and magnitude in operation of said converter.

2. An electric frequency converter comprising a wound stator having a multiphase excitation winding to be excited with alternating current of the supply frequency, a wound rotor having two windings, a commutator rotatable with said rotor, said commutator having its segments electrically connected to one rotor winding, slip rings rotatable with said rotor, said slip rings being connected to tappings in the other rotor winding, stationary brushes for said commutator and a variable voltage transformer for feeding said brushes from the supply line with the power input to be converted in frequency, said slip rings delivering an output with a voltage of variable frequency and magnitude in operation of said converter.

3. An electric frequency converter comprising a wound stator having a multiphase excitation winding to be excited with alternating current of the supply frequency, a wound rotor, a commutator and slip rings rotatable with said rotor, said commutator having its segments electrically connected to said wound rotor, and said slip rings being electrically connected to tappings in said wound rotor, stationary brushes for said commutator, a variable voltage transformer for feeding said brushes from the supply line with the power input to be converted in frequency, and means for introducing into the stator excitation winding circuit a variable voltage which is additive vectorially to the supply voltage, said slip rings delivering an output with a voltage of variable frequency and magnitude in operation of said converter.

4. An electric frequency converter comprising a wound stator having a multiphase excitation winding to be excited with alternating current of the supply frequency, a wound rotor, a commutator and slip rings rotatable with said rotor, said commutator and said slip rings having electrical connections with said wound rotor, stationary brushes for said commutator, a variable voltage transformer for feeding said brushes from the supply line with the power input to be converted in frequency, and means for simultaneously effecting voltage adjustments in the circuits of said stator and rotor to adjust the speed, output frequency and output voltage of said converter.

5. An electric frequency converter comprising a wound stator having a multiphase excitation winding to be excited with alternating current of the supply of frequency, a wound rotor, a commutator and slip rings rotatable with said rotor and electrically connected therewith, stationary brushes for said commutator, a variable voltage transformer for feeding said brushes from the supply line with the power input to be converted in frequency, and means for introducing a compensation voltage into the commutator circuit, said compensation voltage being vectorially at right angles to the voltage for controlling the speed and frequency of said converter.

6. An electric frequency converter comprising a wound stator having a multiphase excitation winding to be excited with alternating current of the supply frequency, a wound rotor, a commutator and slip rings rotatable with said rotor and electrically connected therewith, stationary brushes for said commutator, a variable voltage transformer for feeding said brushes from the supply line with the power input to be converted in frequency, and means for introducing a constant voltage component into the commutator circuit in the vectorial direction of the voltage by which the speed is regulated, for the purpose of shifting the speed range and, in consequence, the frequency range determined by the voltage range of said variable voltage transformer.

7. An electric frequency converter comprising a wound stator having a multiphase excitation winding to be excited with alternating current of the supply frequency, a wound rotor, a commutator and slip rings rotatable with said rotor and electrically connected therewith, stationary brushes for said commutator, a variable voltage transformer for feeding said brushes from the supply line with the power input to be converted in frequency, and an auxiliary winding accommodated in said stator for introducing a voltage component into the commutator circuit of said converter.

8. An electric frequency converter comprising a wound stator having a multiphase excitation winding to be excited with alternating current of the supply frequency, a wound rotor, a commutator and slip rings rotatable with said rotor and electrically connected therewith, stationary brushes for said commutator, a variable voltage transformer for introducing a variable voltage in both the commutator and stator circuits of the converter, the variable voltage produced by the said variable voltage transformer being additive vectorially to the supply voltage in the stator circuit, and a constant voltage winding and a variable voltage winding connected in series in the rotor circuit, said constant voltage winding being the secondary of a transformer having its primary fed from the supply voltage, and said variable voltage winding being linked through transformer action with said variable voltage transformer.

9. An electric frequency converter comprising a wound stator having a winding of the induction motor type fed by a variable voltage winding, a wound rotor, a commutator and slip rings rotatable with said rotor and electrically connected therewith, stationay brushes for said commutator, a variable voltage transformer for introducing a variable voltage in both the commutator and stator circuits of the converter, the variable voltage produced by the said variable voltage transfomer being additive vectorially to the supply voltage in the stator circuit, and a constant voltage winding and a variable voltage winding connected in series in the rotor circuit, said constant voltage winding being the secondary of a transformer having its primary fed from the supply voltage, and said variable voltage winding being accommodated in the stator slots of the frequency converter together with its stator excitation winding.

10. An electric frequency converter comprising a wound stator having a multiphase excitation winding to be excited with alternating current of the supply frequency, a wound rotor, a commutator and slip rings rotatable with said rotor and electrically connected therewith, stationary brushes for said commutator, and an induction regulator for feeding said brushes from the line supply with the power input to be converted in frequency.

11. An electric frequency converter comprising a wound stator having a multiphase excitation winding, a wound rotor, a commutator and slip rings rotatable with said rotor and electrically connected therewith, stationary brushes for said commutator, and a single induction regulator with electrically conected stator and rotor windings for changing the ratio between the stator excitation voltage and the commutator voltage for co-jointly feeding said brushes.

12. An electric frequency converter comprising a wound stator having a multiphase excitation winding to be excited with alternating current of the supply frequency, a wound rotor, a commutator and slip rings rotatable with said rotor and electrically conected therewith, stationary brushes for said commutator and a variable voltage transformer for feeding said brushes from the supply line with the power input to be converted in frequency, the number of phases in the commutator circuit and the slip ring circuit differing from that of the supply.

13. An electric frequency converter for supply from a single phase system and delivery of a multiphase output, comprising a wound stator having a multiphase excitation winding, a wound rotor, a commutator and slip rings rotatable with said rotor and electrically connected therewith, stationary brushes for said commutator and a variable voltage transformer for feeding said converter, the electrical connections between the variable voltage transformer and the converter being of a multiphase character in the primary and secondary circuits.

14. An electric frequency converter applied to the feeding of the primary winding of an alternating current machine, said electric frequency converter comprising a wound stator having a stator winding of the induction motor type, a wound rotor, a commutator and slip rings rotatable with said rotor and electrically connected therewith, stationary brushes for said commutator, and a variable voltage transformer through which said commutator is fed, said slip rings delivering an output voltage of variable frequency and magnitude which is fed to the primary winding of the alternating current machine.

15. An electric frequency converter applied to the feeding of the primary winding of an alternating current motor for the speed variation of such motor from zero speed in either direction of rotation, said electric frequency converter comprising a wound stator having a stator winding of the induction motor type, a wound rotor, a commutator and slip rings rotatable with said rotor and electrically connected therewith, stationary brushes for said commutator and a variable voltage transformer through which said commutator is fed, said slip rings delivering an output voltage of variable frequency and magnitude which is fed to the primary winding of the alternating current motor, reversal of said alternating current motor being effected by changing the speed of said frequency converter from a speed on one side of its synchronous speed to a speed on the other.

16. An electric frequency converter applied to the feeding of an alternating current motor to introduce into said circuit a speed controlling voltage of variable magnitude and frequency, said electric frequency converter comprising a wound stator having a stator winding of the induction motor type, a wound rotor, a commutator and slip rings rotatable with and electrically connected to said wound rotor, a variable voltage transformer through which said commutator is fed, and means for feeding said alternating current motor from said converter slip rings.

17. An electric frequency converter comprising a wound stator having a multiphase excitation winding to be excited with alternating current of the supply frequency, a wound rotor, a commutator rotatable with said rotor, said commutator having its segments electrically connected to the rotor winding, slip rings rotatable with said rotor, said slip rings being connected to tappings in the rotor winding, stationary brushes for said commutator and a variable voltage transformer for introducing a variable voltage into the commutator circuit, said slip rings delivering an output voltage of variable frequency and magnitude in operation of said converter.

BENNO SCHWARZ.

REFERENCES CITED

The following references are of record in the file of this patent:

UNITED STATES PATENTS

| Number | Name | Date |
|---|---|---|
| 1,481,319 | Hellmund | Jan. 22, 1924 |
| 1,831,564 | Hull | Nov. 10, 1931 |
| 2,108,620 | Stober | Feb. 15, 1938 |
| 2,122,273 | Barwick | June 28, 1938 |
| 2,295,319 | Adkins | Sept. 8, 1942 |
| 2,143,215 | Spencer | Jan. 10, 1939 |
| 1,486,889 | Hellmund | Mar. 18, 1924 |

FOREIGN PATENTS

| Number | Country | Date |
|---|---|---|
| 528,878 | British | Nov. 8, 1940 |
| 568,889 | German | Jan. 25, 1933 |
| 389,226 | French | June 22, 1908 |